United States Patent
Resare et al.

(10) Patent No.: US 7,575,030 B2
(45) Date of Patent: Aug. 18, 2009

(54) RUNFLAT DEVICE FOR A MOTOR VEHICLE, AND A MOUNTED ASSEMBLY INCORPORATING IT

(75) Inventors: Lars Johan Resare, Trenton, NJ (US); Olivier Marsaly, Washington Crossing, PA (US); Olivier Heuze, L'isle Adam (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 10/953,767

(22) Filed: Sep. 30, 2004

(65) Prior Publication Data

US 2006/0005906 A1    Jan. 12, 2006

Related U.S. Application Data

(60) Provisional application No. 60/528,212, filed on Dec. 10, 2003.

(51) Int. Cl.
*B60C 17/00* (2006.01)
*B60C 17/04* (2006.01)
*B60C 5/00* (2006.01)

(52) U.S. Cl. .................. 152/516; 152/152; 152/155; 152/157; 152/158; 152/520

(58) Field of Classification Search .................. 152/152, 152/157, 158, 516, 518, 519, 520, 155
See application file for complete search history.

(56) References Cited

U.S. PATENT DOCUMENTS

| 3,509,928 | A | | 5/1970 | Aghnides | |
|---|---|---|---|---|---|
| 3,682,218 | A | * | 8/1972 | Johannsen et al. | 152/158 |
| 4,173,243 | A | | 11/1979 | Wilde et al. | |
| 4,256,158 | A | * | 3/1981 | Chautard et al. | 152/505 |
| 4,263,953 | A | * | 4/1981 | Miceli | 152/158 |

| 6,626,503 | B2 | * | 9/2003 | Coleman et al. | 301/63.101 |
|---|---|---|---|---|---|

FOREIGN PATENT DOCUMENTS

| DE | 1605629 | * | 6/1970 |
|---|---|---|---|
| DE | 2806325 | * | 8/1979 |
| DE | 3809422 | * | 10/1989 |
| DE | 10132411 | * | 2/2003 |
| EP | 0569710 | | 11/1993 |
| GB | 2015439 | * | 2/1978 |

(Continued)

OTHER PUBLICATIONS

Machine translation of JP 06183225, published 1994.*

*Primary Examiner*—Justin Fischer
(74) *Attorney, Agent, or Firm*—Clark & Brody (57) ABSTRACT

The present invention concerns a runflat device for a tubeless mounted assembly for a motor vehicle and an assembly incorporating said device. A device in accordance with the invention for a unit comprises a wheel rim having a plurality of pieces and a tire cover comprising beads mounted against the flanges of the rim, the device comprising:

a support ring for mounting around the rim to support the tire cover following a drop in inflation pressure and divided into at least two ring sectors; and means for locking said beads against the flanges to connect the sectors to the beads.

The device is such that each ring sector comprises a rigid wall which defines at least one internal volume and which defines the lateral faces of the ring sector.

13 Claims, 7 Drawing Sheets

FOREIGN PATENT DOCUMENTS

| | | | |
|---|---|---|---|
| JP | 58-185305 | * | 10/1983 |
| JP | 60-213508 | * | 10/1985 |
| JP | 60-226304 | * | 11/1985 |
| JP | 63-251305 | * | 10/1988 |
| JP | 3231007 | | 10/1991 |
| JP | 06183225 | * | 7/1994 |

* cited by examiner

RUNFLAT DEVICE FOR A MOTOR VEHICLE, AND A MOUNTED ASSEMBLY INCORPORATING IT

This application claims priority of U.S. Provisional Application Ser. No. 60/528,212, filed Dec. 10, 2003.

The present invention relates to a runflat device for a tubeless mounted assembly for a motor vehicle, and to an assembly incorporating said device, allowing a large distance to be covered at a relatively high speed when the assembly is partially or completely deflated. Said runflat device is especially for use in a military vehicle designed for use on all types of terrain, including sand.

BACKGROUND OF THE INVENTION

Known runflat devices are generally constituted by a support ring which is mounted with some clearance about a wheel rim inside a tire cover. Said ring, constituted by a flexible material, is in a single piece and because of its width at its base, it exerts a force to flatten the tire on the rim. Occasionally, rigid devices in a plurality of pieces or sectors are fixed one to another.

Japanese patent document JP-A-03 231007 discloses a runflat device for mounting around a wheel rim of the multi-piece type, comprising:

a metal ring divided into a plurality of arcuate sectors connected together in pairs and with an axial section in the shape of an "I", each vertex of which is designed to support a tire when running flat, and in which the lateral flanges of each base are trapped in a metal anchor element which is also arcuate in shape; and an annular rubber sole which includes a circumferential recess the lateral flanges of which grip around said anchor element and which is designed to be mounted on the rim against the beads of the tire, to wedge said beads against the flanges of the rim.

A major disadvantage of that runflat device is that its weight is relatively high, which makes mounted assemblies incorporating it heavier and thus renders vehicles equipped with such assemblies heavier. This overall increase in weight is particularly deleterious as regards the cost of transporting vehicles by air.

OBJECTS AND SUMMARY OF THE INVENTION

In a first aspect, the invention provides a runflat device for an assembly, comprising a wheel rim made up of a plurality of pieces and a tire cover comprising beads mounted against flanges of said rim, said device comprising:

a support ring for mounting around said rim, divided into at least two ring sectors;

means for locking said beads against said flanges, which are designed to connect said ring sectors to said beads to ensure traction of the assembly in the event of reduced pressure within the assembly; which overcomes the disadvantage mentioned above, by having reduced weight compared with that of known runflat devices for such wheel rims, while providing the mounted assembly with identical traction when running flat over all types of terrain.

To this end, a runflat device in accordance with the invention wherein each ring sector comprises a rigid wall which defines at least one internal volume and which defines the lateral faces of said sector.

This significantly reduces the weight of mounted assemblies and vehicles incorporating said runflat devices, for example armored military vehicles and, as a result, considerably reduces the costs of transporting said vehicles.

In an embodiment of the invention, said rigid wall may define at least two internal volumes separated one from another by a partition, said internal volume and said or each partition extending in the circumferential direction of each ring sector.

It should be noted that this ring architecture provided with one or more partition(s) in the form of a circumferential sector can improve the compressive strength of the runflat device of the invention either when running flat or when under reduced inflation pressure.

In accordance with a further characteristic of the invention, said ring sectors may advantageously be independent of each other (i.e. they are not connected together).

In accordance with a further characteristic of the invention, said lock means are advantageously provided for mounting directly on said lateral faces of each ring sector (i.e. laterally above the radially inner face of each sector), being bonded or applied to each ring sector when mounting in the assembly.

In an embodiment of the invention, said internal volume is hollow (i.e. entirely or partially empty). As a result, the weight of the runflat device of the invention is substantially reduced.

In a further embodiment of the invention, said internal volume is at least partially filled with a cellular material such as a low density polyurethane foam.

In accordance with a further feature of the invention, a radially outer face of said wall of each ring sector is covered with a rubber-based covering to support said tire when running flat.

Advantageously, the overall axial section of said wall of each ring sector is rectangular or trapezoidal in shape.

In an embodiment of the invention, said wall is based on a composite material comprising a matrix based on a resin (for example epoxy) strengthened with a reinforcement of fibers such as glass or carbon fibers.

In a variation of an embodiment of the invention, said wall is advantageously made of metal, preferably based on aluminum or titanium.

It should be noted that the use of aluminum or titanium or of such a composite material for said wall can further reduce the weight of runflat devices of the invention.

In accordance with a further feature of the invention, said means for locking said beads may advantageously comprise at least one pair of annular wedges based on rubber such as natural rubber, each wedge being adapted to match a radially inner zone of one of said lateral faces of the ring.

Advantageously, at least a portion of said wall of the ring sector and said wedges can each have an axial section substantially in the shape of a trapezoid the bases of which are formed by the radially inner and outer faces of said wall and said wedges, respectively, such that said wedges match said lateral faces of said wall. In this case, said wedges of the "trapezoidal belt" type are not bonded to said ring sectors but are applied thereto during assembly.

In general, said rubber-based wedges can be constituted by pairs of sectors respectively integrally mounted with the ring sectors by bonding (i.e. one pair of wedges per ring sector), or they can be constituted by two annular strips which are each in a single piece and are strengthened with reinforcing elements, advantageously formed from a textile, for example aramid, and which are applied during assembly on said ring sectors without being bonded to them.

In a first embodiment of the invention, said runflat device may also comprise an annular sole constituted by the same material as said wall or another rigid material, for example, which is for wedging (i.e. anchoring) on said rim radially below said lock means and is adapted to receive the ring via its radially inner face, to distribute the supported load when running flat by said radially outer face and by said lateral faces on the rim base.

Said sole is advantageously divided into sectors which are respectively attached to said ring sectors, for example by bonding.

In an advantageous embodiment of this first aspect, each ring sector is radially inwardly terminated by a base formed by said wall which is designed to be wedged (i.e. anchored) to said rim radially below said lock means (this base fulfils the aforementioned function of said sole).

Advantageously, the axial cross-sectional shape of said sole or said base can be trapezoidal, the bases of which are constituted by the radially inner and outer faces of said sole or of said wall of the ring sector respectively, at least one side of said trapezoid connecting the bases together being adapted to cooperate with one wall of said rim as an undercut. More advantageously still, the axial section of said sole or said base is in the shape of an isosceles trapezoid the two non parallel sides of which are respectively adapted to cooperate with two lateral undercut walls of a circumferential recess in the rim.

In a second embodiment of the invention, each ring sector can be adapted to be anchored in a groove formed between two of said pieces of said rim via an arcuate anchoring tab extending said radially inner face of said wall radially inwardly. Advantageously, said anchoring tab, viewed in axial cross-section, can extend from one lateral edge of said radially inner face radially inwardly then at a right angle towards the other lateral edge.

A mounted assembly of the invention comprises a wheel rim in a plurality of pieces, a tire cover comprising beads respectively mounted against axially inner and outer flanges of said rim, and a runflat device which is mounted around said rim between said flanges and which is as defined above, said means for locking said beads against said flanges connecting said ring sectors to said beads and allowing permanent traction of the unit by the contact between the bead and the flange.

In the present description, the expressions "axially inner" and "axially outer" respectively refer to the sides of the wheel rim which are designed to face the interior and exterior of the motor vehicle after a mounted assembly comprising said rim has been mounted on a vehicle.

In accordance with a further feature of the invention, said annular wedges, depending on whether they are divided into sectors or are in a single piece, are respectively bonded or applied to said lateral faces of said wall of each ring sector and against said beads, so that said ring sectors, said rim, and said tire cover are constantly constrained together in rotation because of frictional contact on said rim flanges, rotation of the runflat device and the tire cover being avoided.

It should be noted that said means for locking the beads provide the unit with satisfactory traction when running flat and also at low pressure over a variety of terrains, be they loose or compact, undulating or even, from metalled roads to sandy terrain.

In accordance with a further characteristic of the invention, said ring sectors are advantageously independently mounted around said rim.

It should be noted that this independence of the ring sectors is rendered possible by anchoring said sole, said base or said tab of the runflat device between the two pieces of said rim, or by using said bead lock wedges having a one-piece structure and reinforced; this means that it is possible to dispense with rigid fastening and clamping means between the facing ends of the ring, e.g. nut-and-bolt means. Experience has shown that such rigid connections can constitute the weak link in runflat devices (fatigue phenomena, for example).

In the first above-mentioned embodiment of the invention, said device comprises an annular sole which is divided into sectors to which said ring sectors are attached (for example by bonding) and which is mounted in abutment in a circumferential recess with a flat base comprised in said rim. The rim can advantageously comprise two axially inner and outer rim seats on which said beads are mounted, which terminate in said flanges and extend radially inwardly via axially inner and outer lateral walls defining said rim recess, at least one of said lateral walls forming an undercut provided to cooperate with one side of said sole.

In this first embodiment, said bead lock means comprising at least one pair of said annular wedges are advantageously positioned radially above said sole, against said ring sectors and the beads.

In the above-mentioned second embodiment of the invention, each ring sector is anchored by said tab with which it is provided in at least one circumferential groove formed between two said pieces of said rim which respectively comprise said axially inner and outer flanges, said groove being defined by at least one lateral flange having a circumferential channel such that it has an axial section in the form of an "L" or an upsidedown "T". Advantageously, said groove is adjacent to said axially outer rim flange.

In said second embodiment, said bead lock means comprising at least one pair of said annular wedges are advantageously radially positioned slightly above said rim, against said ring sectors and the beads.

In a third embodiment of the invention, said unit is such that said rim has a substantially flat base in axial section (i.e. a flat rim base), and said lock means comprise at least one pair of annular wedges which are based on rubber reinforced by reinforcing elements and each of which is in a single piece, said wedges and a radially inner portion of said ring sector wall each having an axial section in the form of a trapezoid, the bases of which are formed by the radially inner and outer faces of said wall and said wedges respectively, so that said wedges match said lateral faces of said wall and are mounted against the beads and maintain said ring sectors around said rim.

Advantageously, said rim is based on aluminum, titanium or a composite material and said rim could be exclusively constituted by titanium (including bolts for fastening the different pieces of the rim).

It should be noted that using aluminum, titanium, or a composite for said rim can further reduce the weight of the assemblies and thus of vehicles provided therewith.

BRIEF DESCRIPTION OF THE DRAWINGS

Other characteristics, advantages and details of the present invention will become apparent from the following description of some embodiments of the invention, given purely by way of non-limiting illustration, said description being made with reference to the accompanying drawings, in which.

MORE DETAILED DESCRIPTION

Figure 1:
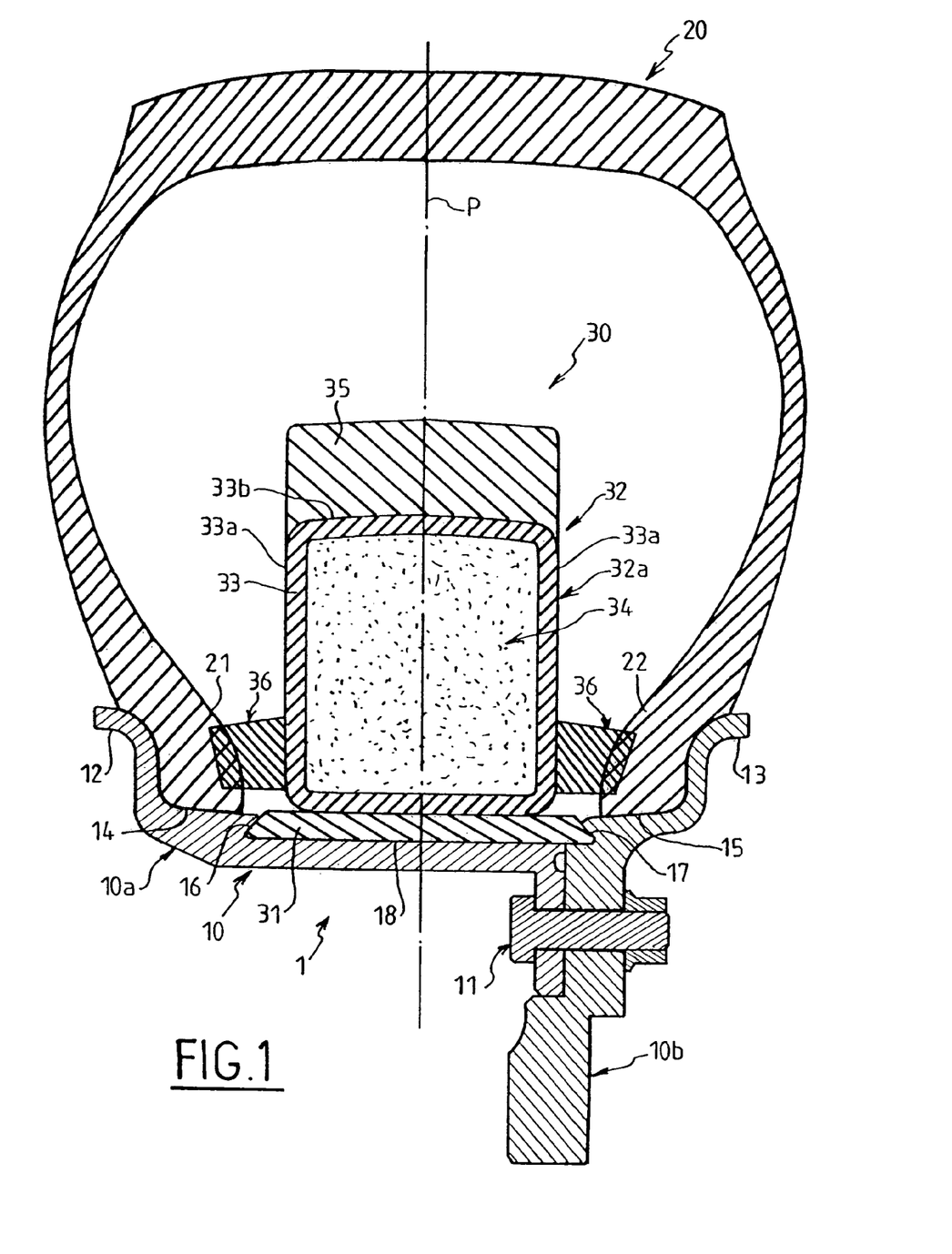
FIG. 1 is an axial half sectional view of an assembly incorporating a runflat device constituting a first embodiment of the invention.
Figure 2:
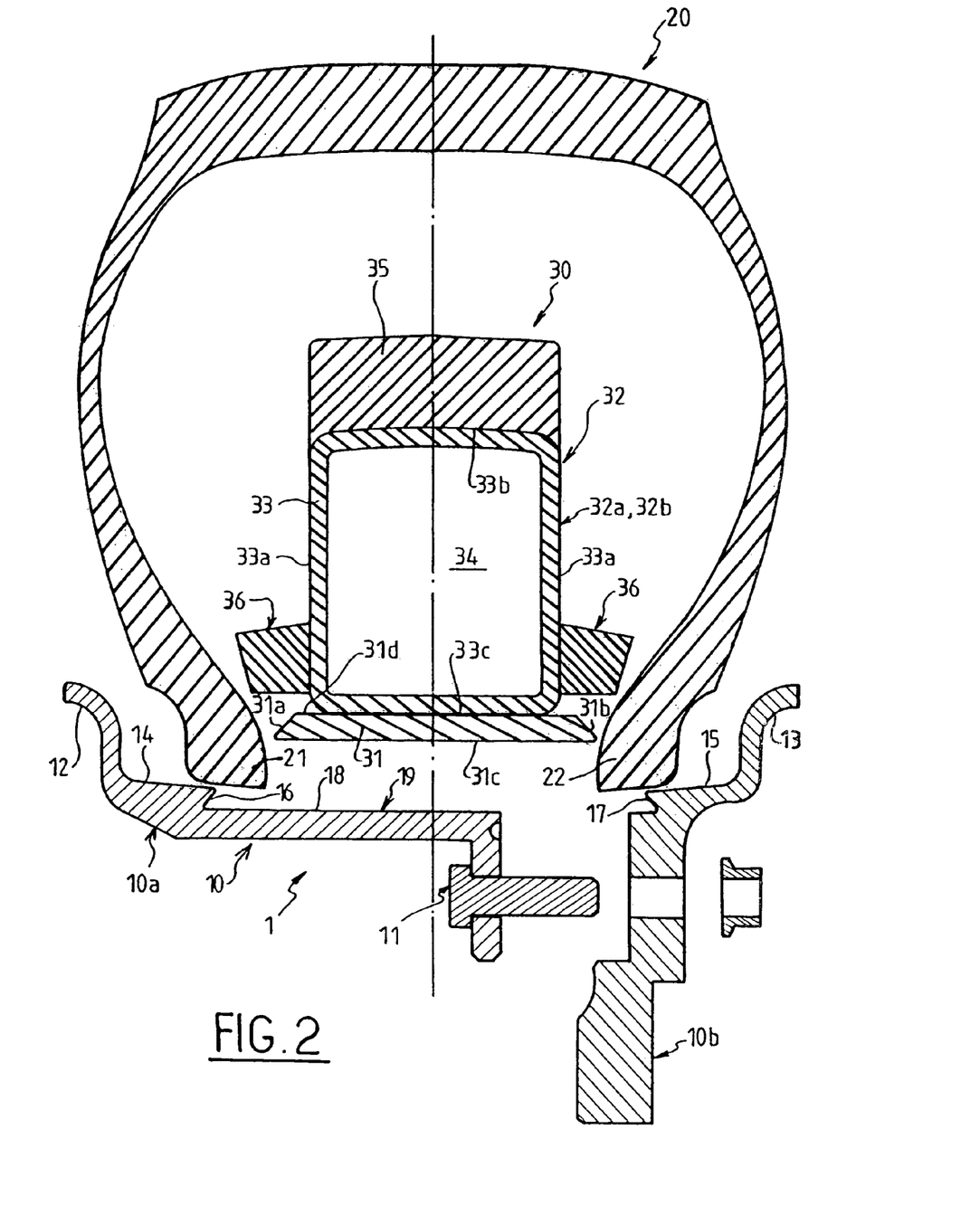
FIG. 2 is an exploded axial half sectional view of an assembly constituting a first variation of FIG. 1.

The mounted assembly 1 of the first embodiment of the invention, shown in FIGS. 1 and 2, comprises a wheel rim 10 in two pieces 10a and 10b fixed to each other by bolt type fastener means 11.

The two blocks 10a and 10b respectively comprise axially inner and outer flanges 12 and 13 respectively defining two rim seats 14 and 15 extending axially from flanges 12 and 13, a tire cover 20, the beads 21 and 22 of which are supported on seats 14 and 15 and against flanges 12 and 13, and a runflat device 30 mounted around the rim 10 inside the tire cover 20 and designed to support it following a drop in inflation pressure inside the assembly 1.

The rim seats 14 and 15 extend radially inwardly via axially inner and outer lateral walls 16 and 17 connected by a base 18 and defining a circumferential rim recess 19 adapted to receive in abutment a radially inner portion of the device constituted by an annular sole 31.

To this end, the lateral walls 16 and 17 of recess 19 form undercuts which are symmetrical with respect to the circumferential medial plane P of the tire cover 20 and which are respectively provided to cooperate with the two sides 31a, 31b of the sole 31, to stop the sole 31 and thus the device 30 from leaving the rim recess 19. Thus, the inner lateral wall 16 is axially and radially inwardly inclined while the outer lateral wall 17 is axially outwardly and radially inwardly inclined.

In this embodiment, the axial section of the sole 31 has the shape of an isosceles trapezoid, the two non parallel sides 31a, 31b of which are respectively adapted to lodge against the lateral walls 16, 17 of recess 19, and the major base 31c of which is adapted to abut the base 18 of the recess 19 and the minor base 31d of which is adapted to support a support ring 32 of the device 30 which is designed to support the tire cover 20 when running flat.

The support ring 32 is divided into at least two independent sectors 32a, 32b in the shape of an arc of a circle, and each sector 32a, 32b comprises a rigid wall 33 defining an internal volume 34 which is filled with a cellular material in FIG. 1, such as a low density polyurethane foam, and which is empty in the variation shown in FIG. 2, said wall 33 defining the lateral faces 33a of each sector 32a, 32b.

The wall 33 of each sector 32a, 32b has a radially outer face 33b which is covered to a predetermined radial depth with a rubber-based covering 35 designed to constitute the interface between ring 32 and the tire cover 20 when running flat, and a radially inner face 33c which is designed to be mounted on the sole 31 in an axially centered manner.

In the example shown in FIGS. 1 and 2, the wall 33 of each sector 32a, 32b has a substantially rectangular axial cross-section, the lateral faces 33a of the wall 33 being parallel and extending parallel over the radial depth of the covering 35.

The wall 33 may be made of metal, preferably based on aluminum or titanium, or based on a composite comprising a matrix of resin (for example epoxy) strengthened with a glass or carbon fiber reinforcement.

The sole 31 is constituted by sectors which are respectively fixed to said ring sectors 32a, 32b, for example by bonding.

The runflat device 30 also comprises means 36 for locking the beads 21, 22 comprising a pair of annular wedges which are constituted by flexible strips based on rubber such as natural rubber, and which are respectively designed to be bonded or applied during assembly (depending on whether the wedges 36 are divided into sectors or constitute a single piece, in which case they are based on reinforced rubber) against the lateral faces 33a of the sectors 32a, 32b and against the facing beads 21, 22 so that the ring sectors 32a, 32b, the rim 10 and the tire cover 20 remain fixed in rotation when running flat.

The wedges 36 are mounted at a distance from the radially inner face 33c of each sector 32a, 32b such that they are radially above the sole 31 and the rim seats 14, 15 in their assembled position against the ring 32 and the beads 21, 22.

Figure 3:
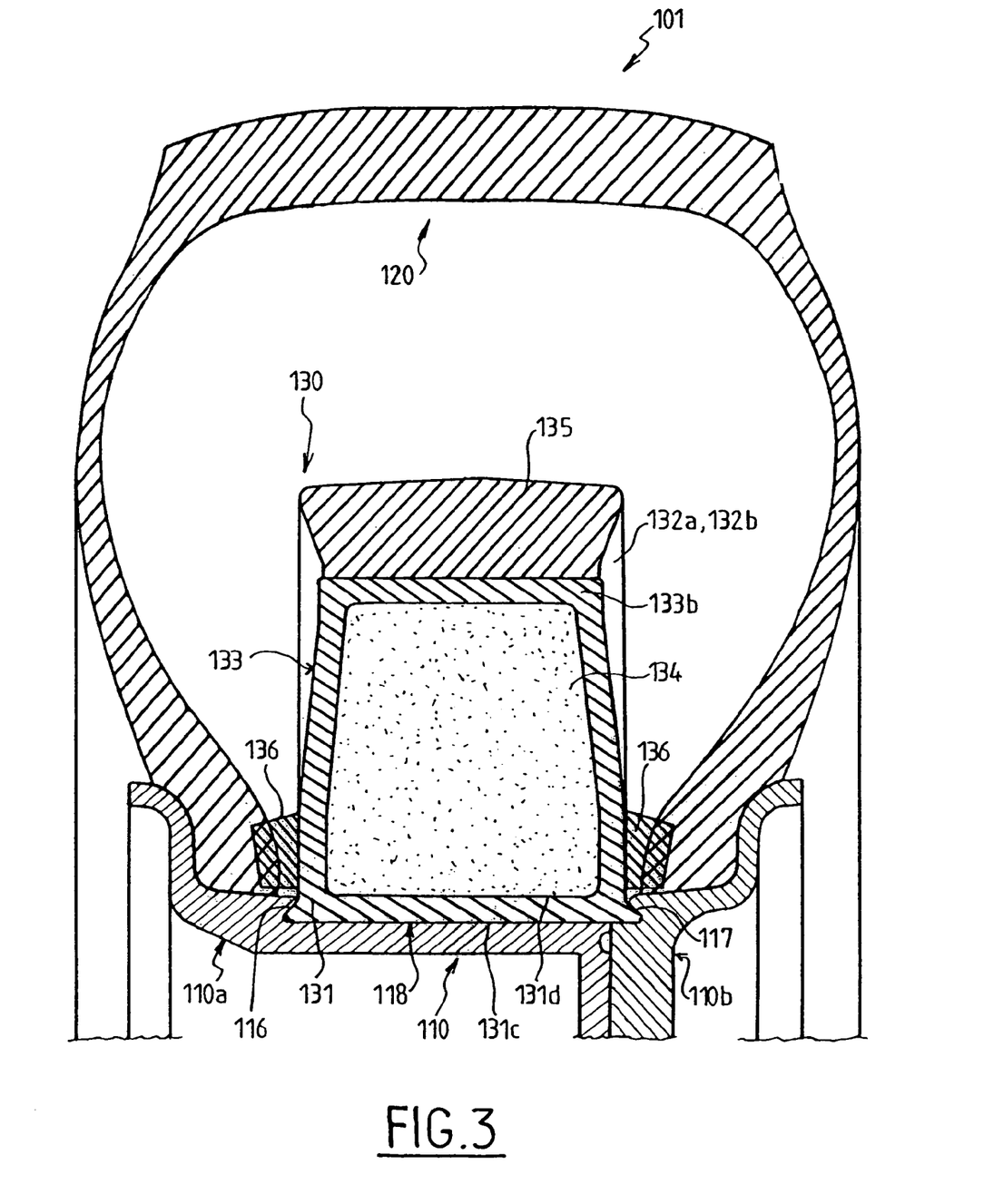
FIG. 3 is an axial half sectional view of an assembly constituting a second variation of FIG. 1.

The mounted assembly 101 illustrated in FIG. 3 corresponds to a second variation of said first embodiment. It differs from the assembly 1 described above essentially in that firstly, it comprises a base 131 forming an integral part of each ring sector 132a, 132b by forming the radially inner face thereof (said base 131 in this example having an isosceles trapezoidal shape analogous to that of the sole 31 in FIG. 1) and secondly, in that the axial width of each ring sector 132a, 132b is constant from the base 131 to a predetermined radial depth designed to receive the wedges 136, then reduces radially outwardly to the radially outer face 133b of the rigid wall 133 (the radial width of the covering 135 increasing from this face 133b).

Figure 4:
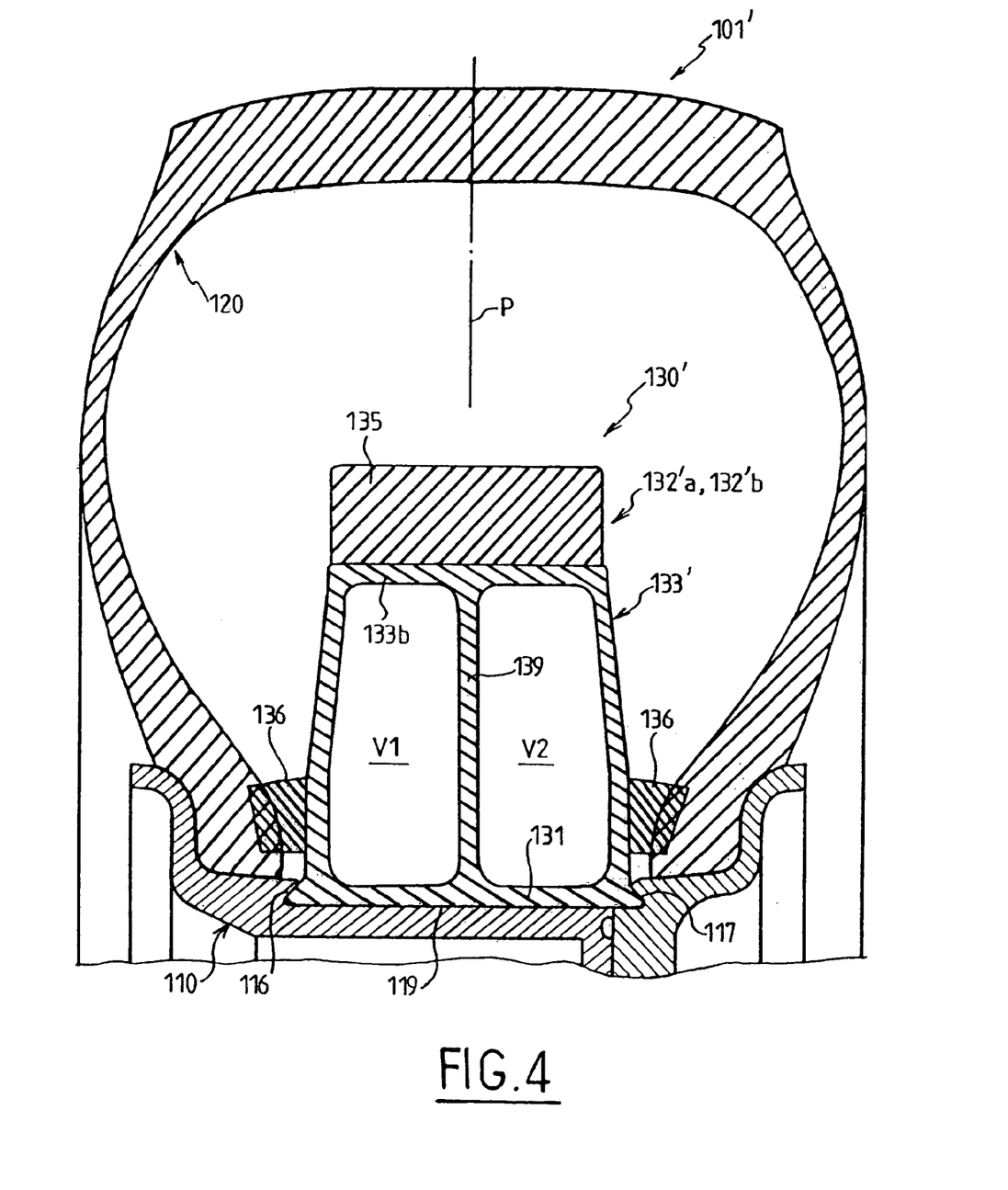
FIG. 4 is an axial half sectional view of an assembly constituting a variation of FIG. 3.

The assembly 101' shown in FIG. 4 corresponds to a first variation of that shown in FIG. 3, and differs essentially in that the rigid wall 133' of each ring sector 132'a, 132'b which it encompasses comprises a medial partition 139 in the form of an arc of a ring. The partition 139 extends in the circumferential direction, and from base 131 to the radially outer face 133b of the wall 133'. This partition 139 defines two identical internal volumes V1 and V2 in this circumferential direction, and is designed to be centered on the medial circumferential plane P of the assembly 101' during mounting of the runflat device 130' onto the rim 110 and against the tire cover 120.

It should be noted that the internal volumes V1 and V2 of each ring sector 132'a, 132'b could differ, with wall 139 not then being centered on said medial plane P.

As is the case with the assembly 1 of FIG. 3, each ring sector 132'a, 132'b comprises a base 131 in the form of an isosceles trapezoid which is adapted to be anchored in the rim recess 119 via undercut lateral walls 116 and 117 of recess 119.

Figure 5:
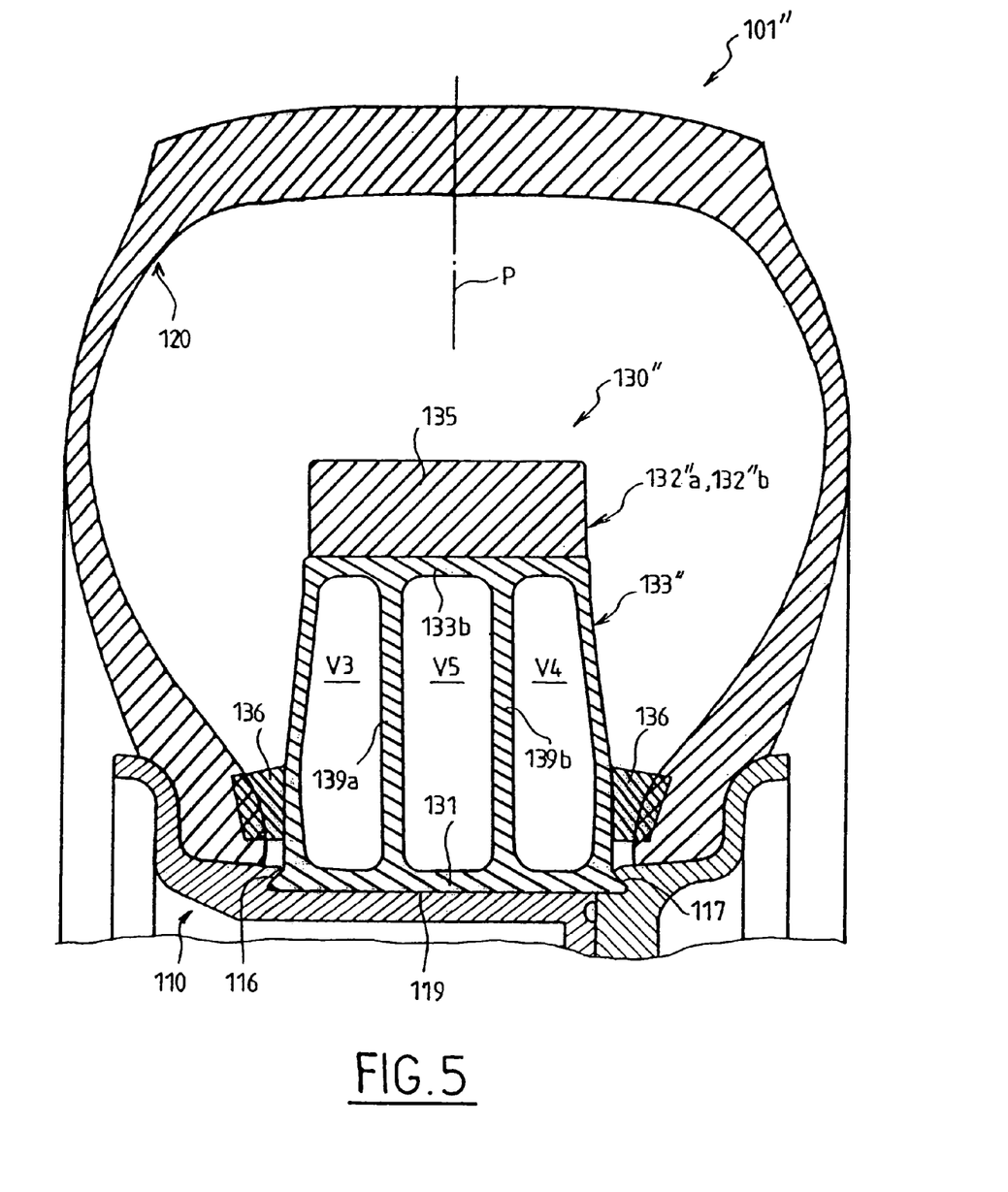
FIG. 5 is an axial half sectional view of an assembly constituting a variation of FIG. 4.

The assembly 101" shown in FIG. 5 corresponds to a variation of that of FIG. 4, its only difference being that the rigid wall 133" of each ring sector 132"a, 132"b which it encompasses comprises two partitions 139a and 139b which are identical, in the form of arcs of a ring. Said partitions 139a, 139b extend in the circumferential direction and from base 131 to the radially outer face 133b of the wall 133", and they define two lateral internal volumes V3 and V4 which are each symmetrical with respect to a medial internal volume V5 designed to be centered on the medial circumferential plane P of the unit 101".

As before, it should be noted that the internal volumes V3 and V4 could be different and would then not be symmetrical with respect to the medial volume V5.

It should be noted that said partitions 139, 139a, 139b endow rings 132'a, 132'b and 132"a, 132"b with improved compressive strength when running flat or under reduced pressure.

Figure 6:
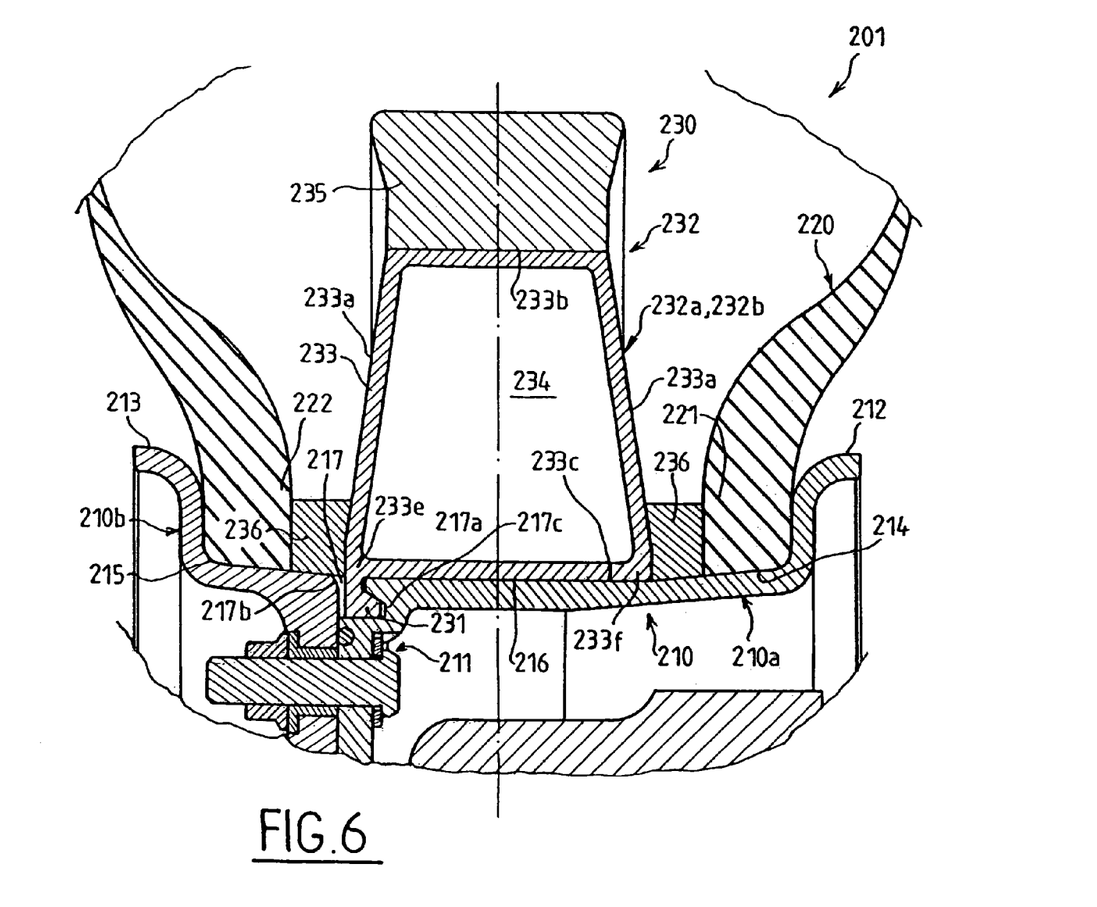
FIG. 6 is a detailed axial half sectional view of an assembly incorporating a runflat device constituting a second embodiment of the invention.

The mounted assembly 201 of the second embodiment of the invention is illustrated in FIG. 6 and also comprises:
- a wheel rim 210 comprising two pieces 210a and 210b attached together using bolt type fastener means 211, pieces 210a, 210b respectively comprising axially inner and outer flanges 212, 213 respectively defining two rim seats 214, 215 extending axially from flanges 212, 213;
- a tire cover 220, the beads 221, 222 of which are supported on seats 214, 215 against the flanges 212, 213; and
- a runflat device 230 mounted around the rim 210 inside the tire cover 220 and designed to support it following a drop in inflation pressure inside the assembly 201.

In contrast to the first embodiment defined above, the rim 210 does not have a circumferential recess designed to receive a sole, but has a rim base 216 which is substantially flat provided with a circumferential groove 217 adjacent to the outer rim flange 213. The groove 217 is designed to receive an anchoring tab 231 of a support ring 232 of the device 230, and is formed between two rim pieces 210a, 210b, being defined by two lateral flanges 217a, 217b, one of which has a circumferential channel 217c, to endow the groove 217 with an axial section in the form of an "L".

As can be seen in FIG. 6, the axially outer flange 217b of the groove 217 is formed by the inner face of the rim piece 210b comprising the outer flange 213, and said flange 217b extends in the radial direction. Regarding the axially inner flange 217a of the groove 217, from the rim base 216 of the other piece 210a it has a first circumferential section directed radially inwardly, extending axially and radially inwardly via channel 217c.

As is the case for the first embodiment mentioned above, the support ring 232 is divided into at least two independent sectors 232a, 232b in the form of an arc of a circle, and each sector 232a, 232b comprises a rigid wall 233 which defines an internal volume 234 and which defines the lateral faces 233a of sector 232a, 232b and said internal volume 234 is advantageously empty, but can in some cases be filled with low density foam.

The wall 233 of each sector 232a, 232b has a radially outer face 233b which is covered over a predetermined radial depth with a rubber-based covering 235 designed to constitute the ring 232 and the tire cover 220 interface when running flat, and a radially inner face 233c designed to be mounted on the rim base 216.

In this embodiment, the wall 233 of each sector 232a, 232b has an axial section which is substantially in the shape of an isosceles trapezoid the major and minor bases of which are respectively constituted by the radially inner 233c and outer 233b faces.

The anchoring tab 231 of each ring sector 232a, 232b is in the form of an arc of a circle, and it extends the radially inner face 233c of the sector 232a, 232b radially inwardly, being adapted to be abutted in groove 217, leaving an axial clearance between the axially inner 217a and outer 217b flanges of the groove 217 and said tab 231. The tab, viewed in axial cross-section, extends radially inwardly from a lateral edge 233e of the radially inner face 233c of each sector 232a, 232b, then at a right angle towards the other lateral edge 233f of said inner face 233c.

This wall 233 can be constituted by the same metal or composite materials as those defined with reference to the first embodiment.

The runflat device 230 further comprises means 236 for locking the beads 221, 222 comprising a pair of annular wedges analogous to those in said first embodiment, said wedges 236 also being designed to be bonded or applied to the lateral faces 233a of sectors 232a, 232b and against the facing beads 221, 222 so that the ring sectors 232a, 232b, the rim 210 and the tire cover 220 remain fixed in rotation.

Figure 7:
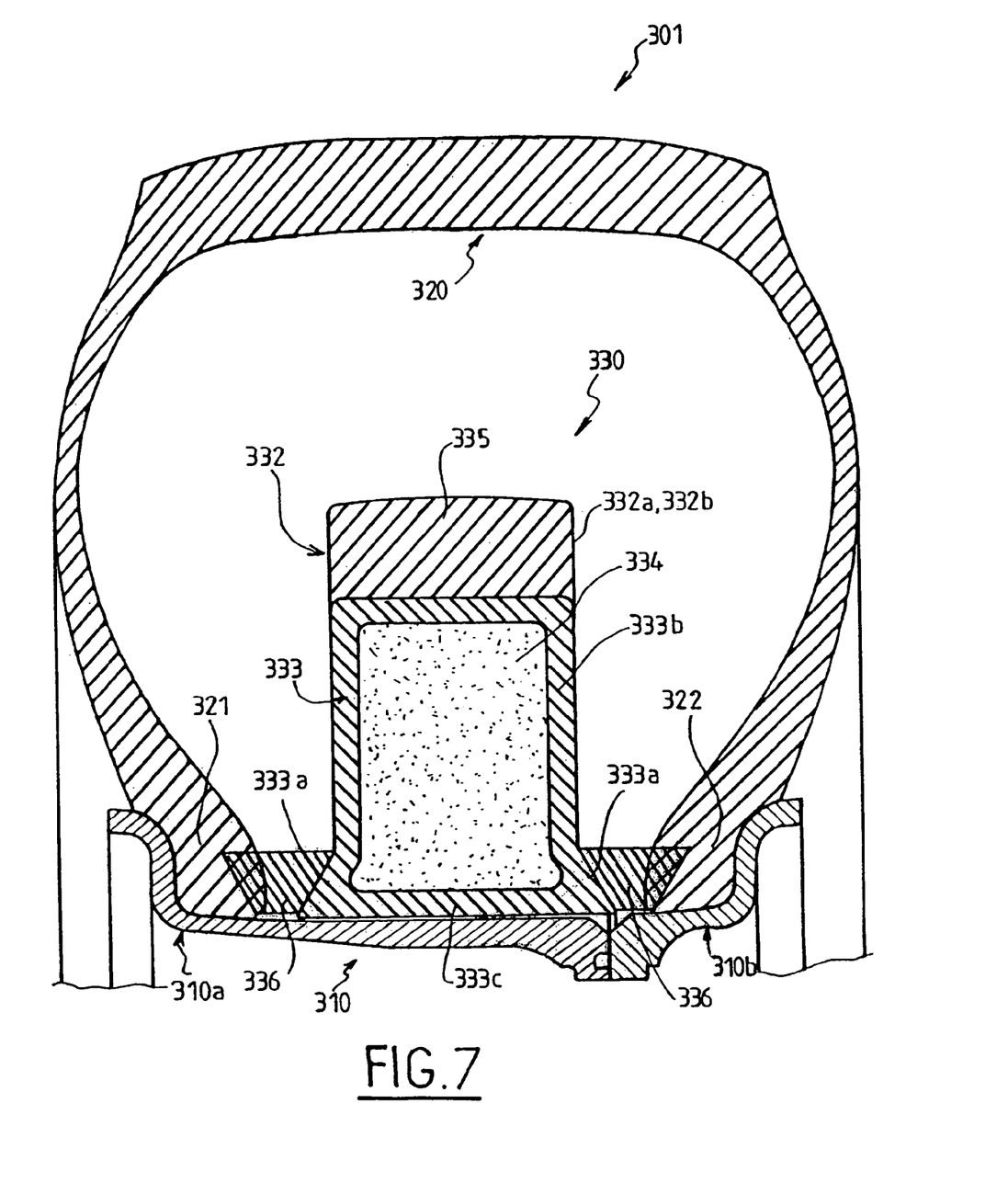
FIG. 7 is an axial half sectional view of an assembly incorporating a runflat device constituting a third embodiment of the invention.

The mounted assembly 301 in the third embodiment shown in FIG. 7 differs from the assemblies 101, 201 described above in the following points:

Firstly, the rim 310 has a substantially flat rim base.

Secondly, each ring sector 332a, 332b has a radially inner zone 333a with an axial section in the form of an isosceles trapezoid the non parallel sides of which are directed radially outwardly towards each other to constitute two lateral application zones for two annular wedges 336 for locking beads 321, 322. Radially outwardly from said inner zone 333a, each ring sector has a radially outer zone 333b with a rectangular axial section (i.e. constant width).

Further, each wedge 336 is constituted by a one-piece rubber-based strip which has a "trapezoidal belt" shape adapted for being pressed during assembly (i.e. not bonded) by one of its non parallel sides against one side of said radially inner zone 333a. Each wedge 336 is advantageously strengthened with textile reinforcing elements, for example of aramid.

It should be noted that said strengthened one-piece trapezoidal wedges 336 are designed to keep the ring sectors 332a, 332b around the rim 310 attached together.

What is claimed is:

1. A tubeless mounted assembly for a motor vehicle, comprising a wheel rim comprising a plurality of pieces and a tire cover comprising beads respectively mounted against axially inner and outer flanges of said rim, and a runflat device mounted around said rim between said flanges and comprising:
    a support ring to support said tire cover following a drop in inflation pressure inside said unit and which is divided into at least two ring sectors, each ring sector being in the shape of an arc of a circle, said ring sectors forming the support ring when circumferentially arranged end to end; and
    means for locking said beads against said flanges to connect said ring sectors to said beads;
    wherein each ring sector comprises a rigid wall which defines at least one internal volume and which defines the lateral faces of said sector, said ring sectors being mounted independently of each other to form said support ring around said rim by said lock means, which comprises at least one pair of annular wedges directed mounted on a radially inner zone of said lateral faces of said rings sectors, each annular wedge being made:
    (i) of a single piece applied against a lateral face of the support ring, or
    (ii) of wedge sectors respectively bonded to said ring sectors on a lateral face thereof, if the runflat device is anchored in the rim,
    wherein at least a portion of said wall of each ring sector and said wedges each has an axial section substantially in the shape of a trapezoid having only two parallel sides, the bases of which are formed by the radially inner and outer faces of said wall and said wedges respectively, so that said wedges match said lateral faces of said wall.

2. An assembly according to claim 1, wherein said rigid wall defines at least two internal volumes separated one from the other by a partition, said internal volume and said or each partition extending in the circumferential direction of each ring sector.

3. An assembly according to claim 1, wherein said wall is based on a composite material such as epoxy resin reinforced with glass or carbon fibers, each ring sector being anchored by a tab with which it is provided in at least one circumferential groove formed between two said pieces of said rim which respectively comprise said inner and outer flanges, said groove being defined by at least one lateral flange having a circumferential channel such that it has an axial section in the form of an "L".

4. An assembly according to claim 3, wherein said groove is adjacent to said axially outer rim flange.

5. An assembly according to claim 1, said runflat device is wedged on said rim radially beneath said lock means by:
   (i) an annular sole receiving said support ring, said sole being divided into sectors which are respectively attached to said ring sectors, or by
   (ii) a radial inner base of each ring sector of said support ring, said base being formed by said wall,
   said annular sole or said radial inner base being abutted in a circumferential recess with a flat base comprised in said rim.

6. An assembly according to claim 5, wherein said rim comprises two axially inner and outer rim seats on which said beads are mounted, which terminate in said flanges and extend radially inwardly via axially inner and outer lateral walls defining said rim recess, at least one of said lateral walls forming an undercut provided to cooperate with one side of said sole or said base.

7. An assembly according to claim 1, wherein said rim has a substantially flat base in axial cross-section, and each annular wedge is made of a single piece of rubber strengthened with reinforcing elements, each wedge and a radially inner portion of each ring sector each having a trapezoidal axial section the bases of which are formed by the radially inner and outer faces of said wall and said wedges respectively, such that said wedges match said lateral faces of said wall, being mounted against the beads and maintaining said ring sectors around said rim.

8. An assembly according to claim 1, wherein said rim is based on aluminum or titanium.

9. An assembly according to claim 8, wherein said rim is constituted exclusively by titanium.

10. An assembly according to claim 1, wherein said internal volume is hollow.

11. An assembly according to claim 1, wherein said internal volume is at least partially filled with a cellular material.

12. An assembly of claim 11, wherein the cellular material is a low density polyurethane foam.

13. An assembly according to claim 1, wherein said wall of each ring sector has a radially outer face which is covered with a rubber-based covering to support said tire cover when running flat.

* * * * *